2,792,389

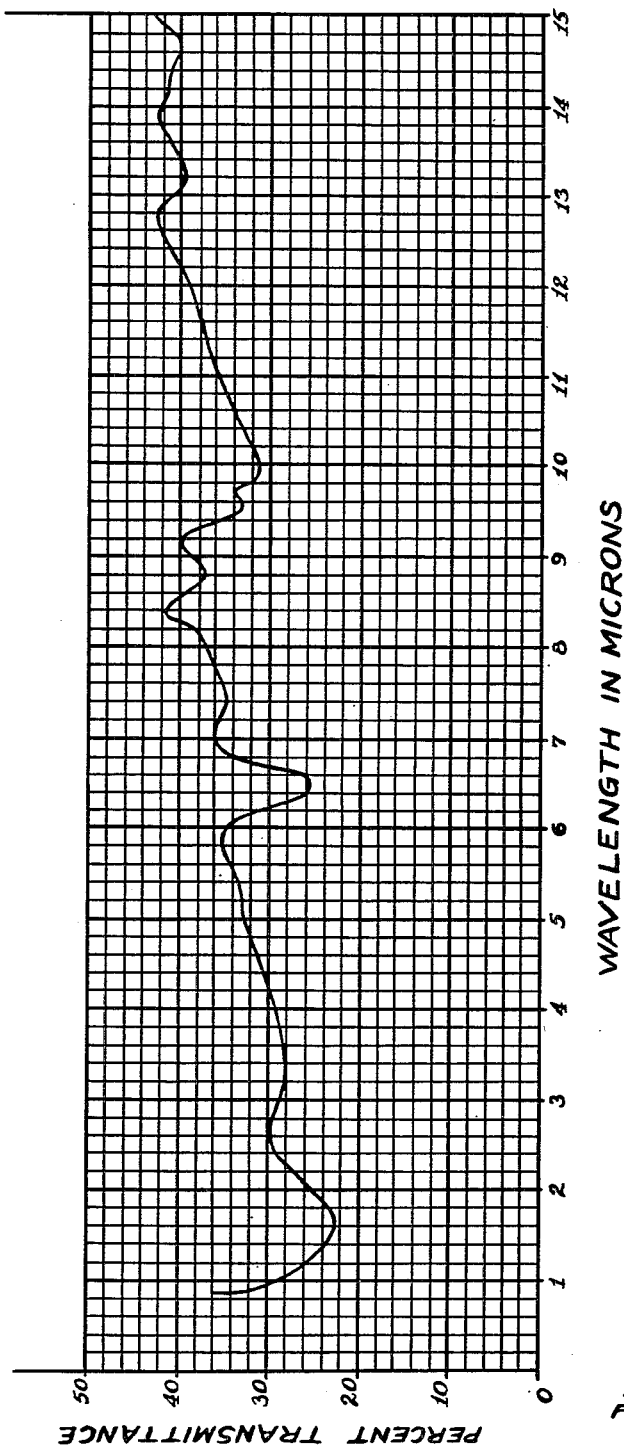

United States Patent Office

Patented May 14, 1957

2,792,389

PREPARATION OF BIOLOGICALLY ACTIVE MATERIAL FOR PROMOTING THE GROWTH OF LACTOBACILLUS BIFIDUS

Rudolph Michael Tomarelli, Lansing, Elmer Ralph Eckhardt, Mason, and Finn Westelius Bernhart, Holt, Mich., assignors to American Home Products Corporation, New York, N. Y., a corporation of Delaware Continuation of application Serial No. 395,816, December 2, 1953. This application May 5, 1954, Serial No. 427,793

5 Claims. (Cl. 260—211)

This application is a continuation of our copending application Serial No. 395,816, now abandoned, filed December 2, 1953.

This invention relates to new crystalline compounds prepared by acid hydrolysis of animal mucin, which compounds possess high activity for promoting the growth of the microorganism Lactobacillus bifidus. Our invention is also directed to the recovery process by which the active growth-promoting substance is secured from animal mucin.

The microorganism Lactobacillus bifidus has been the subject of extensive study and research, and strains of the organism have been found to require that a specific growth-promoting factor be present in the medium in order that they may propagate and flourish. One of such strains, identified as Lactobacillus bifidus var. Penn, has been isolated and characterized as a result of the work of Dr. Paul György and others. (See Amer. J. Dis. Child. 84, 482 [1952].)

Lactobacillus bifidus is the characteristic and predominating microorganism of the intestinal bacterial flora of the breast-fed infant. The stools of infants who have been fed exclusively with human milk are remarkable in that this microorganism is present therein as the chief microorganism.

As seen in smears when freshly isolated from infant feces the L. bifidus organism appears as Gram-positive, straight or curved rods that are non-motile and that do not form spores. One or both ends may appear to be split longitudinally to give the effect of two short branches. This appearance of the microorganism has led to the term "bifid." One end of the organism may be bulbous or racket-shaped.

While this microorganism predominates in the intestinal tract and feces of infants fed with human milk from lactating mothers, it is not the characteristic or predominating microorganism in the intestinal tract of infants fed with other foods, such as cow's milk, or with the commercially available food preparations derived from, or based on, cow's milk. Infants so fed show a less uniform intestinal flora, with an appreciable proportion of Gram-negative rods and cocci.

The fact that a stable L. bifidus flora is characteristic only of the intestinal tract of breast-fed infants is now fully understood and appreciated by pediatricians and other specialists in the medical, biological, and nutritional sciences. See, for example, the publications of Tissier, Comptes rendus soc. biol., 51, pages 943–945; and 60, pages 359–361; and Ann. inst. Pasteur, 19, pages 109–123; and 22, pages 189–207. See also the papers of Moro; Wien. Klin, Wochschr.; 13, pages 114–115, and Jahrb. Kinderheilk., 61, pages 687–734; and 61, pages 870–899. That the original observations of Tissier concerning the predominance of L. bifidus in nurslings' stools have been amply confirmed is pointed out in the more recent publication of Norris, Flanders, Tomarelli and György in the Journal of Bacteriology, 60, pages 681–696 (December 1950).

Medical authorities are now in general agreement that many of the advantages which a breast-fed infant seems to have, insofar as its nutrition and resistance to certain diseases are concerned, are attributable, at least in part, to the predominance of L. bifidus in his intestinal tract. The prevalence of this organism in the intestinal tract is now believed to be of physiological significance, and its growth may prevent intestinal disorders caused by other bacteria. Resistance to bacterial intestinal diseases, and even to parenteral disorders such as respiratory infections, is typical of breast-fed infants. Infants with infant feeding formulae utilizing cow's milk as the source of protein are definitely more susceptible to such disorders. In this connection see the article of Robinson in "Lancet," entitled: "Infant Morbidity and Mortality," vol. CCLX, page 788 (April 7, 1951).

In the infant colon in which a stable L. bifidus flora is lacking it is now generally believed that the infant is more likely to suffer from disorders attributable to the growth of other bacteria, some of which are harmful to the infant, since competition for the available food supply in the infant intestinal tract where L. bifidus flourishes reduces the possibility that other bacteria, particularly the harmful B. coli, may grow in considerable numbers or in extensive colonies. In any event, where the Gram-positive bacillus L. bifidus is present in large numbers in the infant intestine, there is considerably less growth of other microorganisms, particularly of the Gram-negative B. coli, the Clostridia, and certain air-borne microorganisms such as the Sarcinae bacteria. While the reasons for the superior resistance to disease of breast-fed infants as compared with infants who are fed on cow's milk, or on the usual infant formulae in which cow's milk is a principal constituent, are not fully understood, pediatricians are generally agreed that, in some measure at least, the superior resistance is attributable to the presence of an extensive L. bifidus flora in the intestines of nurslings, this bacterium being absent in any considerable numbers from the intestines of infants who are not fed with human milk. Interest in the isolation and determination of the growth requirements of L. bifidus has therefore been stimulated by its apparently unique predominance in the intestinal tract of the breast-fed infant.

It has now been found that it is possible to separate from the feces of breast-fed infants various strains of the L. bifidus microorganism which are characteristically not able to propagate except when grown on media containing human milk. Such strains have been successfully isolated and characterized serologically, in addition to their biochemical behavior, to an extent sufficient to permit their recognition and use in nutritional studies. Various of these strains have been referred to in the scientific literature, one of them, in particular, having been originally designated as Strain No. 212 A, but now renamed as Lactobacillus bifidus var. Penn.

In view of the importance, in nutrition, of the Lactobacillus bifidus var. Penn strain as recovered from the feces of breast-fed infants and characterized serologically various scientific studies of this strain of the microorganism have been published in scientific journals. The fact that it needs human milk (or the growth factor present in human milk) for its propagation and growth, and that it shows no growth in the usual media satisfactory for most strains of L. bifidus, has been discussed in a paper by György published in Pediatrics, vol. 11, No. 2, (February 1953), pages 98 to 108, entitled "A hitherto unrecognized biochemical difference between human milk and cow's milk." This strain of the microorganism is also referred to (under the designation No. 212A) in an article by Williams, Norris and György, published under the title: "Antigenic and cultural relationships of *Lactobacillus bifidus* and *Lactobacillus parabifidus*" in the March-April 1953 issue of the Journal of Infectious Diseases, vol 92, pages 121–131. It is pointed out in the latter article that this specific strain will not grow in the chemically defined medium of Norris et al. (Jour. of Bacteriology; volume 60, pages 681–696), unless breast milk is added as a supplement to the medium. The growth requirements of this variant of the *Lactobacillus bifidus* microorganism, with special reference to the fact that var. Penn will grow in the regular medium for *Lactobacillus bifidus* only after human milk has been added thereto, are further discussed in a paper by P. György, R. F. Norris, and C. S. Rose, entitled: "Bifidus factor I. A variant of *Lactobacillus bifidus* requiring a special growth factor," in Archives of Biochemistry and Biophysics, 48, 193 (1954).

This variant of the *L. bifidus* microorganism, which shows scant or undetectable growth in the usual medium for *Lactobacillus bifidus* growth (i. e., that of Norris et al.) does not differ morphologically from regular strains of the microorganism. Thus, *Lactobacillus bifidus* var. Penn is microaerophilic and Gram-positive, showing typical branching. Serologically, however, it appears to contain a distinct antigenic component, different from that found in other strains of *L. bifidus*. Moreover, this new strain is characterized by distinct lability, sometimes showing a tendency towards the formation of very mucoid colonies on plates and greatly increased viscosity in liquid mediums. Such mucoid colonies retain, in repeated transfer, their mucoid character, and no reversion to the original non-mucoid strain has been observed. These mucoid colonies, however, still require the presence of human milk (or of the growth-promoting factor contained therein) for their growth.

Regular strains of *Lactobacillus bifidus* may utilize maltose interchangeable with lactose. In contrast thereto, the *L. bifidus* var. Penn strain, in addition to the growth factor, requires lactose as its source of carbohydrate. It will show only very scant growth in the presence of maltose. Except as to its requirement for lactose and for the special growth factor present in human milk in order that appreciable growth may occur, differences in the metabolic pattern of *L. bifidus* var. Penn from that of regular bifid strains of the *Lactobacillus bifidus* microorganism have not been observed.

For some time research has been carried out in an effort to isolate and identify the active biological factor present in human milk which is essential for promoting the growth of strains of the *Lactobacillus bifidus* organism requiring this factor, such as the var. Penn strain. In the copending patent application of György, Kuhn and Zilliken, Serial No. 283,006, filed April 18, 1952, the isolation and recovery of this growth-promoting factor from human milk is described and claimed.

Extensive research work has been carried out on the identification and isolation of the active biological principle which is responsible for promoting the growth of *L. bifidus* in the intestines of infants who are nourished with human milk, which active principle is evidently not present in sufficient amount to insure the growth of *L. bifidus* as the predominant microorganism in the intestinal tract of infants who are fed with cow's milk, or with any of the usual feeding compositions or infant formulas based on cow's milk. This research has demonstrated that while the specific growth-promoting substance or factor may be also present to a very slight extent in cow's milk, the amount contained in cow's milk is proportionally so small as to be only a very small percentage of the amount contained in an equal volume of human milk. It is present therein in so small a relative amount that an infant fed with cow's milk is not provided with enough of the growth-promoting substance or factor to insure dominance of the *L. bifidus* microorganism in his colon and feces. These differences between human milk and cow's milk are more fully set forth in the article of György in Pediatrics, volume 11, No. 2 (February 1953), page 98 et seq.

In the copending patent application of György, Kuhn and Zilliken, Serial No. 283,006, filed April 18, 1952, there is disclosed and claimed a process by which this active biological principle, the *Lactobacillus bifidus* growth-promoting factor, may be recovered from human milk. This application also claims the *L. bifidus* growth-promoting factor as a new composition of matter, the new substance being characterized both chemically, and by its physical and other properties. This new biological factor is also referred to, and chemically characterized, in the copending patent application of Paul György, Serial No. 385,275, filed October 9, 1953.

By a process which involves defatting human milk, removing substantially all protein therefrom, removing inorganic and mineral substances then remaining in the human milk fraction, and finally by adsorbing the active growth-promoting factor or principle on a solid adsorbent and eluting it therefrom by means of suitable eluants, the new growth-promoting factor for *Lactobacillus bifidus* was recovered from breast milk.

As recovered in the form of a dry powder and as described in said patent application, the new biologically-active material is identified as being non-protein in character. It is free from amino acids, peptides and proteins. It does not give a positive test with ninhydrin, but after acid hydrolysis the ninhydrin test becomes positive, due to the formation of d-glucosamine.

Chemically the new *Lactobacillus bifidus* growth-promoting factor is characterized as comprising substances of the group of N-glycosides containing N-acetylhexosamines in glycosidic linkage. Upon hydrolysis under acid conditions it is converted to hexosamines, as determined colorimetrically by the Morgan-Elson test.

The new growth-promoting factor contains the chemical elements nitrogen, hydrogen, carbon and oxygen, but it does not contain either sulfur or phosphorus. Its nitrogen content is relatively low, falling within the range 1.7% to 2.0%. It is adsorbed on adsorbent agents such as carbon, charcoal, cellulosic products such as filter paper, adsorbing resins and cellulosic powders, being, however, most typically and easily adsorbed on the carbonaceous adsorbents. It is extremely resistant to high temperatures and will withstand temperatures well over 100° C., as, for example, during the process of sterlization wherein it is heated under pressure in aqueous solutions at a temperature of 120° C. for 15 minutes or longer. The growth-promoting factor of human milk is present in a large proportion in a dialyzable form (see article by György in Pediatrics, volume 11, No. 2, pages 98, 102; February 1953). In addition to the dialyzable fraction, a varying portion of the growth factor is present in a non-dialyzable form. The latter may be precipitated by ethanol at a concentration between 60–80%.

The infrared absorption spectrum of a mineral oil mull of the *Lactobacillus bifidus* growth-promoting factor exhibits characteristic maxima at approximately the following frequencies: 3700; 3000; 2360; 1820; 1600; 1500; 1410; 1190; 920; 830; 800; and 740 cm.$^{-1}$. Of these, the maxima at 1820; 1410; 920; 830; 800 and 740 cm.$^{-1}$ are broad maxima. The maxima at 3700; 3000; 1600; and 1500 cm.$^{-1}$ are relatively sharper peaks.

As recovered from breast milk, the *Lactobacillus bifidus* growth-promoting factor is found to have an activity for promoting the growth of strains of the *Lactobacillus bifidus* microorganism, typically the *L. bifidus* var. Penn strain, which is more than ten times that of the human milk fraction initially subjected to adsorption in the process by which the factor is recovered from human milk. Hereinafter, whenever the *Lactobacillus bifidus* growth-promoting factor is referred to, this material is the biologically active substance intended.

Recently various additional sources for the growth-promoting factor necessary to support the growth of such strains of the microorganism as *L. bifidus* var. Penn have been found in naturally-occurring materials and in chemical substances derived therefrom. These products supplying the *Lactobacillus bifidus* growth factor (also sometimes called the György growth factor) have been incorporated in foodstuffs intended for infant feeding and for the feeding of older persons. For example, in the copending application of Tomarelli, Hassinan, Durbin and Bernhart, Serial No. 283,244, filed April 19, 1952, (now Patent No. 2,697,663; issued December 21, 1954), the fact that hog gastric mucin supplies the *L. bifidus* growth-promoting factor is disclosed, as well as the incorporation of hog gastric mucin in various food compositions that are lacking or deficient in the growth factor, but which may be otherwise nutritionally adequate.

We have now found that it is possible to prepare crystalline chemical compounds having very high activity for promoting the growth of *L. bifidus*, and especially for promoting the growth of those strains thereof, such as *L. bifidus* var. Penn, to whose growth the presence of the growth-promoting factor is essential by a process which involves hydrolyzing animal mucin. Generally we prefer to use animal gastric mucin derived from various animals including the hog, although mucin from other sources, such as that from the small intestines or salivary glands, may also be used. By subjecting animal mucin of this type to acid hydrolysis, followed by partial neutralization of the reaction products and adsorption of the active substance therefrom on adsorbent agents, and then eluting it from the adsorbent agent and recovering the product, it is possible to secure new crystalline disaccharide substances which are much more active in promoting the growth of *Lactobacillus bifidus*, especially *Lactobacillus bifidus* var. Penn and other strains requiring the presence of growth-promoting factor in order that they may grow, than is the gastric mucin starting material.

Although various animal sources of the starting material may be used, we prefer to utilize hog gastric mucin as the source of the crystalline disaccharide compounds. This is derived industrially from the gastric mucosa and gastric juice of swine, and contains glycoproteins as its chief or active constituent. It contains mostly complex mucopolysaccharides including: a neutral polysaccharide containing acetyl glucosamine and galactose in the ratio of 1:1; an acid mucopolysaccharide containing acetyl glucosamine, sulfuric acid and an undetermined uronic acid; and blood group A substance of gastric mucosa, which is a combination of protein and neutral polysaccharides. All these components have high molecular weights, ranging perhaps from 100,000 to 500,000. See Karl Meyer, "Advances in Protein Chemistry," volume II (Academic Press Inc., New York, 1945).

The hog gastric mucin commercially available is frequently prepared by aqueous extraction of hog mucosa, followed by precipitation with organic solvents. It is soluble in water, insoluble in alcohol, and forms a viscous solution in water.

The new crystalline compounds produced by the hydrolysis of animal gastric mucin under acid conditions comprise a new disaccharide of empiric formula $C_{14}H_{25}O_{11}N$, and two addition compounds of the disaccharide containing, respectively, one mole of methanol of crystallization, and one-half mole of dioxan of crystallization. These two latter products have, respectively, the following empiric formulae: $C_{14}H_{25}O_{11}N \cdot CH_3OH$ and $(C_{14}H_{25}O_{11}N)_2 \cdot C_4H_8O_2$.

The anhydrous disaccharide $C_{14}H_{25}O_{11}N$ can probably be represented by the structural formula:

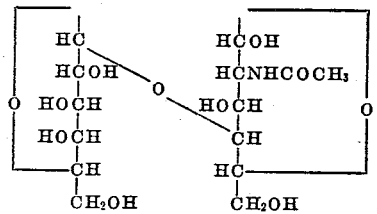

It comprises a galactose moiety and an N-acetyl-d-glucosamine moiety, and is probably galactosido (1,4)-N-acetylglucosamine. The new anhydrous disaccharide crystallizes in needle crystal form, after concentration to a syrupy solution and refrigeration overnight.

The annexed drawing constitutes an infrared absorption spectrum of the new disaccharide. Since it is insoluble in the solvents commonly used with salt cells, a dry preparation on a salt plate was employed in securing this infrared absorption spectrum. The plate was prepared by mulling the crystalline disaccharide (that form of the compound containing one mole of methanol of crystallization was used) in carbon disulfide, and then allowing the suspension to evaporate on the plate. The instrument used for determining the infrared spectrum was a Beckman IR-25 with a Nernst "Glowar" tube.

As will be evident from the drawing, absorption peaks were found at $6.50\mu$, $8.85\mu$, and at $9.55\mu$, with broad peaks at $9.9\mu$ to $10.25\mu$, and at $13.1\mu$ to $13.6\mu$. The peak at $6.50\mu$ is taken as indicative of the presence of the substituted amino group, while the peak at $8.85\mu$ indicates an ether linkage.

By treatment with acetic anhydride in acetic acid, the compound is converted to an octaacetyl compound of empiric formula $C_{28}H_{39}O_{18}N$ having an optical rotation in chloroform of $$\left[\alpha\right]_D^{30°} = +61.5°$$

Chemical and physical data relative to the two other crystalline products, containing, respectively, one mole of methanol of crystallization, and one-half mole of dioxan of crystallization, are given hereinafter. Since these compounds are fully equivalent to the non-hydrated crystalline product with needle crystals, $C_{14}H_{25}O_{11}N$, in their activity for promoting the growth of *Lactabacillus bifidus* var. Penn, and are, in fact, only crystalline forms of the disaccharide compound of the chemical structure previously given containing, respectively, methanol of crystallization, and dioxan of crystallization, it is evident that all three new compounds are properly classed together from the chemical point of view.

In preparing the new crystalline products possessing high activity for promoting the growth of *Lactobacillus bifidus* from animal mucin, the mucin should first be subjected to partial hydrolysis under acid conditions. During the hydrolysis two reactions simultaneously occur: liberation of the desired disaccharide material from the polysaccharides present; and chemical modification of the desired disaccharide material. Hydrolysis is continued to the point of maximum content of free disaccharide in the hydrolyzate. When the hydrolysis is carried out under preferred conditions, there is usually present in the hydrolyzate from 20 to 40 percent of the original *Lactobacillus bifidus* activity of the mucin.

We prefer to carry out the hydrolysis by treating the animal mucin, such as animal gastric mucin, preferably commercially-available hog gastric mucin, with a dilute solution of a strong non-oxidizing acid. We ordinarily prefer to use an acid such as sulfuric acid or hydrochloric acid. The concentration of the acid may vary over a considerable range, and generally the higher the temperature at which the hydrolysis is effected, the lower the time required to hydrolyze to the desired degree, and the weaker the concentration of acid needed to effect the desired degree of hydrolysis.

Merely as illustrative of various acid concentrations, temperatures and times of hydrolysis which have been found to give good results when the material treated is commercially-available hog gastric mucin, conditions which have given satisfactory results are specified in the following table. The acid used was sulfuric acid.

| Concentration of Acid Utilized | Temperature at Which Hydrolysis is Carried Out, °C. | Time Required to Hydrolyze Mucin |
| --- | --- | --- |
| 0.6 N | 98 | 1 hour. |
| 0.1 N | 98 | 3 hours. |
| 2.0 N | 98 | 20 minutes. |
| 0.6 N | 50 | 16 hours. |
| 0.6 N | 60 | 8 hours. |
| 0.6 N | 70 | 4 hours. |
| 0.6 N | 80 | 2 hours. |
| 2.0 N | 50 | 6 hours. |
| 2.0 N | 60 | 3 hours. |
| 2.0 N | 70 | 1.5 hours. |
| 2.0 N | 80 | 45 minutes. |
| 2.0 N | 90 | 30 minutes. |

It is thus evident that the temperature utilized during the hydrolysis should generally be 40° C. or above, and it may range up to a temperature close to the boiling point. Temperatures above the boiling point may also be used, in which case the hydrolysis should be carried out in a pressure-resistant vessel. The concentration of the acid, such as sulfuric or hydrochloric acid, employed to effect the partial hydrolysis may range from 0.1 N to 2.0 N or even higher. The time during which the mucin material is in contact with the hot acid will generally depend on the temperature and the acid concentration, but periods ranging from approximately 20 minutes to about twenty hours, or even longer, may be employed. In general, the time required at any given acid concentration will be approximately one-half as long for each 10° C. rise in temperature.

The resulting reaction product is then preferably neutralized to a pH of approximately 3.5, at which pH the active material is more readily adsorbed on the adsorbent agent and maximum precipitation of undesired material from the hydrolyzate occurs. However, the pH, after neutralization, may range from 2.0 to 6.5 with practically equivalent results. In the step of neutralizing the hydrolyzed product an alkaline material is added, and we have secured very satisfactory results by the addition of alkali metal carbonates, such as sodium bicarbonate or potassium bicarbonate, and alkali metal and alkaline earth metal hydroxides, such as sodium hydroxide and calcium hydroxide.

The neutralized clear hydrolyzate is then brought into contact with an adsorbent agent such as activated carbon, in order that the L. bifidus growth-promoting substance may be adsorbed thereon. It is then eluted therefrom by means of a suitable eluant, such as an aqueous solution of acetic acid of 5 to 50 percent $CH_3COOH$ concentration. Other organic acids, such as formic acid, propionic acid, butyric acid, and lactic acid may also be employed. Also, solvents such as methanol, and aqueous mixtures of methanol, isopropanol and acetone, may be used, but these are generally less satisfactory than the acids.

We have secured very satisfactory results by utilizing 20 percent aqueous acetic acid as the eluant (this concentration being expressed on a weight-per-weight basis). It is generally desirable to elute by treating the adsorbent agent, such as activated carbon, with hot eluant, as high temperature elution is more efficient. However, elution at relatively lower temperatures may also be employed, and will give fairly satisfactory results. There is thus obtained a solution of the active material which may then, if desired, be subjected to further purification.

This is readily accomplished by first evaporating the eluate down to syrup consistency. The active material is soluble in methanol. By adjusting the methanol concentration to a value above 85 percent in an aqueous methanolic solvent, the inactive material is precipitated, thus further purifying the desired product. Similar purification can be effected at methanol concentrations as low as 70 percent, but for most effective precipitation and separation of impurities, the concentration of methanol in the solution containing the active fraction should preferably be adjusted to a value within the range 85 percent to 90 percent, these percentages being expressed on a volume-per-volume basis.

Further purification is readily accomplished by chromatography, preferably by chromatographing on a column of alumina, or on an acid clay material essentially consisting of aluminum silicate, one of which is the commercially available product "Super filtrol." By crystallization from a solvent such as methanol there is obtained a crystalline product having high activity for promoting the growth of Lactobacillus bifidus, and especially for promoting the growth of such strains thereof as L. bifidus var. Penn.

The chromatographic purification is preferably (but not necessarily) carried out using two different adsorbents in sequence, the activity being eluted from each by means of suitable eluants. Thus, we can first adsorb on activated alumina, followed by elution therefrom with methanol; and the active material may then be adsorbed on a different adsorbent, such as aluminum silicate. Upon elution of the adsorbed material from the second adsorbent, a purified product results from which the novel active product can be crystallized.

The use of two different adsorbents in sequence for the chromatographic separation effects better purification of the active material than would be obtained by the use of but one of the adsorbing agents twice, in individual chromatographic separation steps. For example, it is possible to use activated alumina twice, in two separate adsorptions, as the adsorbent agent, but the yield of active product would be somewhat lower.

As illustrative of one method of operating in accordance with our invention to secure our novel crystalline disaccharide products, effective in promoting the growth of Lactobacillus bifidus, especially such variants as Lactobacillus bifidus var. Penn, of high activity, the following detailed procedure may be followed. This is a preferred embodiment of our process, and it constitutes the best manner known to us of producing the novel crystalline compounds. However, various modified or changed procedures may be utilized.

One kilogram of hog gastric mucin was suspended in 20 liters of 0.6 N aqueous sulfuric acid solution. This was accomplished by slowly adding the hog gastric mucin to about 10 to 15 times its own weight of warm water at a temperature of 40 to 60° C., while vigorously agitating the suspension. This resulted in a homogeneous suspension which could be easily stirred. Enough sulfuric acid was then added to this suspension, together with additional water, to give an aqueous solution of sulfuric acid of 0.6 N concentration with the gastric mucin homogeneously suspended therein. The mixture was heated to a temperature of about 98° C. for approximately one hour to hydrolyze the mucin.

Enough sodium carbonate was then added to adjust the pH of the suspension to 3.6, and the mixture was allowed to cool to 25° C. Insoluble material was filtered off, and 3.75 kilograms of activated carbon was added to the filtrate, together with an equal weight of a diatomaceous earth filter aid material, this material being added solely to facilitate filtration. We have used the diatomaceous earth sold by Johns-Manville as "Celite" No. 545, although other diatomaceous earth filter aids are equally effective. The mixture was then filtered, and the filtrate discarded.

The filter cake was first washed with an aqueous solution of acetic acid of 1 percent concentration (on weight basis) until the filtrate contained approximately 5 milligrams of solids per milliliter. The wash water was discarded. The biologically-active material was then eluted from the carbon adsorbent, using 80 liters of aqueous acetic acid of 20 percent (w./w.) concentration at a temperature of 95° C. as the eluant. This required about 30 minutes, the temperature during this elution step being within the range 95-100° C. The mixture was then filtered while still hot, and the filter cake washed with 12-15 liters of aqueous acetic acid of 1 percent concentration. The filtrates were then combined, and the filter cake discarded.

The combined filtrates were evaporated to a syrup, several small portions of water being successively added toward the end of the evaporation to insure expulsion of acetic acid. This step may advantageously be carried out in a partial vacuum, i. e., at a pressure less than atmospheric. Upon the addition of 2 volumes of methanol, a precipitate formed, and this was extracted four times, each time with an amount of methanol equal to approximately one-half the volume of the original syrup, thus removing substantially all of the methanol-soluble material. The methanol solutions were combined, and additional methanol added in amount sufficient to adjust the methanol concentration to a value within the range 85-90 percent (v./v.).

The precipitate which formed was removed by centrifugal separation, and washed with a small volume of methanol. This precipitate was then discarded; the methanol solutions were combined; and the combined solutions were again evaporated to a syrup at a reduced pressure less than atmospheric. This resulted in a concentrated extract of hydrolyzed mucin in methanol.

The syrup was then poured on an evenly-packed, non-stratified activated alumina column using approximately 10 grams of alumina for each gram of solids in the methyl alcohol extract. The constituents were separated by first washing the column with anhydrous methanol, followed by washing it with an aqueous solution of methanol of 50 percent concentration. Several fractions were collected in this way, and all those fractions having a potency higher than 1.5 units of activity per milligram were combined. The potency was determined by microbiological assay, using a strain of *L. bifidus* which requires the growth-promoting factor as an essential for growth. (The strain *L. bifidus* var. Penn was used.) These fractions were then evaporated at a reduced pressure, less than atmospheric, to a thick syrupy consistency. Water was removed from the syrup by adding anhydrous methanol thereto, followed by distillation, and this procedure was repeated two additional times in order to insure complete removal of water.

The substantially dry methanolic solution was then poured on a column filled with an acid clay adsorbent material comprising essentially aluminum silicate. "Super filtrol," a product of this type supplied by Filtrol Corporation, has given very satisfactory results. The column contained 20 grams of the adsorbent per gram of solids in the syrupy solution. In order to increase the rate of flow, an equal weight of diatomaceous earth filter aid material ("Celite" No. 545 of Johns-Manville Corporation) was added. The activity was washed through the column; first by the addition of anhydrous methanol; then by the addition of aqueous methanol of 90 percent concentration; and finally by the use of 50 percent aqueous methanol. Several fractions were collected; and eluates containing 3 units of activity per milligram, or higher, were evaporated to dryness. The residue was dried down by heating under reduced pressure in a vacuum oven at 60° C. overnight. The dry residues were dissolved in methanol, and insoluble material was removed from the resulting solution by centrifugal separation. The methanol solution was allowed to stand overnight in a cold room.

The following morning crystals in the form of square platelets were observed in the liquid, and they were removed by centrifugal separation and dissolved in the minimum amount of water necessary to bring them into solution. Upon the addition of 20 volumes of methanol to the solution, and allowing the solution to stand, crystals in the form of square plates again formed in the liquid. This recrystallized product, a new disaccharide product, had an *L. bifidus* growth-promoting potency of 12 units per milligram.

This new crystalline disaccharide product, containing one mole of methanol of crystallization, is very soluble in water. It is also soluble in pyridine, slightly soluble in absolute methanol, and insoluble in the other usual organic solvents such as ethanol, acetone, ethyl ether, petroleum ether, isopropanol, chloroform, butanol and dioxan. Its optical rotation in water (solution of 4.6% concentration) is:

$$[\alpha]_D^{22°} = +26.7°$$

A representative sample melted at 169-171° C.

When dissolved in 1 percent concentration (by weight) in water, the active product gave a positive Fehling test, showing it to be a reducing sugar. It gave a negative or slightly positive Elson-Morgan test; (depending upon the exact method used for this test). (See: Biochem. J., 28, 988). It gave a negative ninhydrin test, thus indicating substantial absence of amino acids.

The new active material is hydrolyzed by heating with 3N hydrochloric acid for two hours at 100° C., d-galactose and glucosamine being among the decomposition products thus produced. D-galactose and N-acetyl-d-glucosamine are produced by enzymatic hydrolysis. The presence of galactose in the molecule is confirmed by the production of mucic acid by nitric acid oxidation.

Primary analysis demonstrated the minimal formula of the crystalline product in the form of square platelets containing one mole of methanol of crystallization to be $C_{15}H_{29}O_{12}N$. That the crystals contained a methanol of crystallization was established by a positive test for the methoxy group.

By dissolving this crystalline product in the form of square platelets in a minimum amount of water and adding dioxan, there is obtained a crystalline product in needle form, having a minimal formula $C_{16}H_{29}O_{12}N$. This product, as crystallized from water-dioxan, gave a negative test for the presence of methoxy groups. It melted at about 145-150° C., and its optical rotation, in water, was substantially the same as that of the product containing one mole of methanol of crystallization.

The compound, both as crystallized from aqueous dioxan and from methanol, is therefore a disaccharide composed of d-galactose and N-acetyl-d-glucosamine. The square platelets in the form of the product crystallized from aqueous methanol contained one mole of methanol of crystallization, the compound having the empiric formula, $C_{14}H_{25}O_{11}N \cdot CH_3OH$. The theoretical molecular weight of this compound in the form of square platelets, 415, was confirmed by the Barger method (modified), and by the stoichiometric titration of aldose with hypoiodite (see Macleod et al.; Biochem. J., 23, 517). The crystalline product in the form of needles as crystallized from aqueous dioxan contained one mole of dioxan to two moles of the disaccharide. It had the empiric formula $(C_{14}H_{25}O_{11}N)_2 \cdot C_4H_8O_2$.

An enzymatic digest of the new compound, containing methanol of crystallization gave a quantitative determination for N-acetyl-d-glucosamine of 56.0±1.9 percent, thus substantially agreeing with the theoretical value of 53.3 percent.

In preparing the compound in form free from methanol or dioxan of crystallization, having the empiric formula $C_{14}H_{25}O_{11}N$ and the structural formula given above, approximately 100 milligrams of the compound $C_{14}H_{25}O_{11}N \cdot CH_3OH$, as prepared above, may be dissolved in 2 milliliters of water, warmed, and concentrated to a syrup in an air stream. The syrup, upon refrigeration overnight, crystallized in the form of needles. Determination of values for carbon, hydrogen, nitrogen and oxygen confirmed the empiric formula $C_{14}H_{25}O_{11}N$. It was stable when heated at 100° C. for one hour, M. P. 206–208° C. The anhydrous compound contained no water, alcohol, or dioxan of crystallization.

The growth-promoting activity or potency of the new compound $C_{14}H_{25}O_{11}N$, in anhydrous form, or in the form wherein methanol or dioxan of crystallization is present, is a measure of its ability to promote the growth of such strains of the Lactobacillus bifidus microorganism as L. bifidus var. Penn. It may be expressed in terms of the weight of the material needed to give a standard growth response. This standard growth response, which is the unit of potency and is sometimes referred to as E, is the growth response given by approximately 0.06 milliliter of human or breast milk of average growth-promoting activity. (The growth-promoting activity of breast-milk varies to some extent, and the unit of growth response is based on average conditions.)

In testing for potency, the microorganism L. bifidus var. Penn may be employed, using a medium which is complete in all substances required for its growth except the L. bifidus growth-promoting factor (sometimes called the György factor). These other ingredients include: potassium acid phosphate; lactose; sodium acetate; enzymatic digest of caseine; adenine; guanine; uracil; xanthine; alanine; cystine; tryptophane; asparagine; desoxyribonucleic acid; thiamin; riboflavin; pantothenic acid or pantothenates; pyridoxin; nicotinic acid; pyridoxal; pyridoxamine; p-aminobenzoic acid; folic acid; vitamin $B_{12}$; ascorbic acid; and mineral salts.

For example, a typical double strength medium is constituted as follows. This is diluted by the addition of an equal amount of water before use. In each liter of the double strength medium there are the following:

| | | |
|---|---|---|
| Potassium acid phosphate ($K_2HPO_4$) | grams | 5.0 |
| Lactose | do | 70.0 |
| Anhydrous sodium acetate | do | 50.0 |
| Enzymatic digest of casein | do | 10.0 |
| Adenine | do | 0.02 |
| Guanine | do | 0.02 |
| Uracil | do | 0.02 |
| Xanthine | do | 0.02 |
| Alanine | do | 0.4 |
| Cystine | do | 0.4 |
| Tryptophane | do | 0.4 |
| Asparagine | do | 0.2 |
| "Tween" 80 (Polyoxyalkylene sorbitan monooleate) | do | 0.2 |
| Desoxyribonucleic acid | do | 0.2 |
| Thiamin hydrochloride | milligrams | 0.4 |
| Riboflavin | do | 0.4 |
| Calcium pantothenate | do | 0.8 |
| Pyridoxine hydrochloride | do | 2.4 |
| Nicotinic acid | do | 1.2 |
| Pyridoxal | do | 0.4 |
| Pyridoxamine | do | 0.4 |
| p-aminobenzoic acid | do | 0.02 |
| Folic acid | do | 0.02 |
| Vitamin $B_{12}$ | do | 0.02 |
| Biotin | do | 0.008 |

The "Tween" 80 (product of Atlas Powder Co., Wilmington, Delaware) is present as a non-toxic source of oleic acid.

To this medium, 10 milliliters of a salt mixture comprising (per 250 milliliters of water): 10 grams of $MgSO_4.7H_2O$; 0.5 gram of $FeSO_4.7H_2O$; 0.5 gram NaCl; and 0.337 gram of $MnSO_4.H_2O$; was added. The pH was then adjusted to about 6.8, and after sterilization, 10 milliliters of ascorbic acid added to each 10 milliliters of the single strength (i. e., diluted) medium, prior to culturing.

In carrying out the tests to determine potency for promoting the growth of L. bifidus var. Penn, there are added to various tubes, each containing 5 milliliters of the double strength medium, varying measured quantities of a standard material of known potency, and the substance under test whose potency is to be determined. After making the volume up to 10 milliliters, with water, the tubes and contents are sterilized by autoclaving. After cooling, 10 milligrams of ascorbic acid in concentrated sterile solution are added and the tubes are inoculated. After anaerobic cultivation for forty hours with 10 percent carbon dioxide, the growth in each of the tubes is estimated by determining the amount of acid produced by the growing microorganism, by titration with sodium hydroxide. Comparison is then made of the growth resulting from quantities of standard and unknown, and the potency of the unknown material calculated. The unit used, E, is equal to the amount of growth produced by 200 micrograms of hog gastric mucin (unhydrolyzed), since 200 micrograms of hog gastric mucin will give about the same amount of growth as given by including 0.06 milliliter of human breast milk of average growth-promoting activity in the medium.

The crystalline products obtained by the procedure described have an activity of about 12 units per milligram of material. The new crystalline products are therefore approximately 2.5 times as active as unhydrolyzed hog gastric mucin for promoting the growth of strains of Lactobacillus bifidus requiring the growth-promoting factor in order that they may grow, typically L. bifidus var. Penn.

Since various changes and modifications may be made in the invention, certain preferred embodiments of which have been herein described, it is our intention that such changes and modifications as are within the scope of the appended claims shall be considered as part of our invention.

We claim:

1. The process of preparing a crystalline product having high activity for promoting growth of strains of the microorganism Lactobacillus bifidus which comprises hydrolyzing hog gastric mucin at a temperature within the range 40° C. to the boiling point by contacting said mucin with a dilute solution of a mineral said; partially neutralizing the resulting reaction mixture; adsorbing active material therefrom on an adsorbent agent; eluting said adsorbent agent to wash off said active material; concentrating the resulting eluate by heating; redissolving the active material present in said concentrated eluate by adding methanol thereto; and crystallizing out from the resulting solution said crystalline product having high activity for promoting growth of said microorganism.

2. The process of preparing a crystalline product having high activity for promoting growth of strains of the microorganism Lactobacillus bifidus which comprises hydrolyzing hog gastric mucin by treatment thereof with a dilute solution of a mineral acid at a temperature within the range 40–100° C.; neutralizing the resulting reaction mixture by the addition thereto of a sufficient amount of an alkaline agent selected from the group consisting of the alkali metal carbonates and alkali metal and alkaline earth metal hydroxides to adjust the pH thereof to approximately 3.5; treating the resulting partially neutralized solution with adsorbent carbon in order to adsorb said active material thereon; eluting said adsorbent carbon with aqueous acetic acid of approximately 20 percent concentration, thereby obtaining an eluate containing said active material; evaporating said eluate to secure a concentrated solution thereof; adding to said concentrated solution sufficient methanol to precipitate impurities therefrom; reconcentrating the resulting clear solution; subjecting the resulting concentrated solution to chromatography on an alumina column, and eluting said column with methanol; concentrating said solution, and subjecting said concentrated solution to chromatography on an aluminum silicate column; washing the activity from said column by treatment thereof with anhydrous methanol and aqueous methanol; evaporating the resulting solution containing the active material to dryness; dissolving the dry residue in methanol, and removing insoluble material therefrom; and allowing the resulting clear solution to stand until a crystalline product forms therein.

3. The process of preparing a crystalline product having high activity for promoting growth of strains of the microorganism *Lactobacillus bifidus* which comprises hydrolyzing hog gastric mucin with an aqueous mineral acid selected from the group which consists of sulfuric acid and hydrochloric acid, said acid having a concentration ranging from 0.1 N to 2.0 N, and said hydrolysis being effected by bringing said gastric mucin into contact with said aqueous acid at a temperature ranging from 40° C. to the boiling point for a period of time ranging from about 20 minutes to twenty hours; partially neutralizing the resulting reaction mixture by adding an alkaline agent thereto until the pH falls within the range 2.0 to 6.5; treating the resulting partially neutralized reaction mixture with adsorbent carbon in order to absorb said active material thereon; eluting said adsorbent carbon with an acidic eluting agent selected from the group which consists of acetic acid, formic acid, propionic acid, butyric acid, lactic acid and citric acid, the concentration of said acid ranging from 5 to 50 percent, thereby obtaining an eluate containing said active material; evaporating said eluate to secure a concentrated solution of said active material; adding methanol to said concentrated solution, thereby precipitating impurities present therein; reconcentrating the resulting clear solution containing said active material; subjecting the resulting concentrated solution to chromatographic separation, first on an alumina column, and then on an aluminum silicate column, the active material being washed therefrom after each adsorption by treatment of said columns, first with anhydrous methanol, and then with aqueous methanol, thereby obtaining a purified solution containing said active material dissolved therein; evaporating said purified solution to dryness; dissolving the resulting dry residues in methanol; removing insoluble material therefrom; and allowing the resulting clear methanolic solution of said active material to stand until a crystalline product forms therein.

4. The process as defined in claim 3, wherein the resulting crystalline product is redissolved in an aqueous solution of dioxan and crystallized from said solution, thereby securing a crystalline active material for promoting the growth of *Lactobacillus bifidus* wherein the crystals are in the form of small needles.

5. The process of preparing a disaccharide material having high activity for promoting growth of strains of the microorganism *Lactobacillus bifidus* which comprises hydrolyzing hog gastric mucin under acid conditions until the hydrolyzate contains a maximum percentage of free disaccharides, said hydrolysis being carried out by treating said hog gastric mucin with an aqueous mineral acid selected from the group which consists of sulfuric acid and hydrochloric acid, said acid having a concentration ranging from 0.1 N to 2.0 N, and said hydrolysis being carried out by bringing said gastric mucin into contact with said aqueous acid at a temperature within the range 40° C. to the boiling point for a period of time ranging from about 20 minutes to 20 hours, and then recovering said active material from said hydrolyzate.

References Cited in the file of this patent

Karl Meyer et al.: Chem. Abst., v. 31, page 6265 (1937).
Yoshizawa: Chem. Abst., v. 44, page 4940e (1950).
Yoshizawa: Chem Abst., v. 45, pages 2519–20 (1951).
Matsuda et al.: Chem. Abst., v. 45, page 9576i (1951).